April 26, 1932.  S. P. SHACKLETON  1,855,321
GAS PRESSURE ALARM SYSTEM FOR TOLL CABLES
Filed Jan. 27, 1930
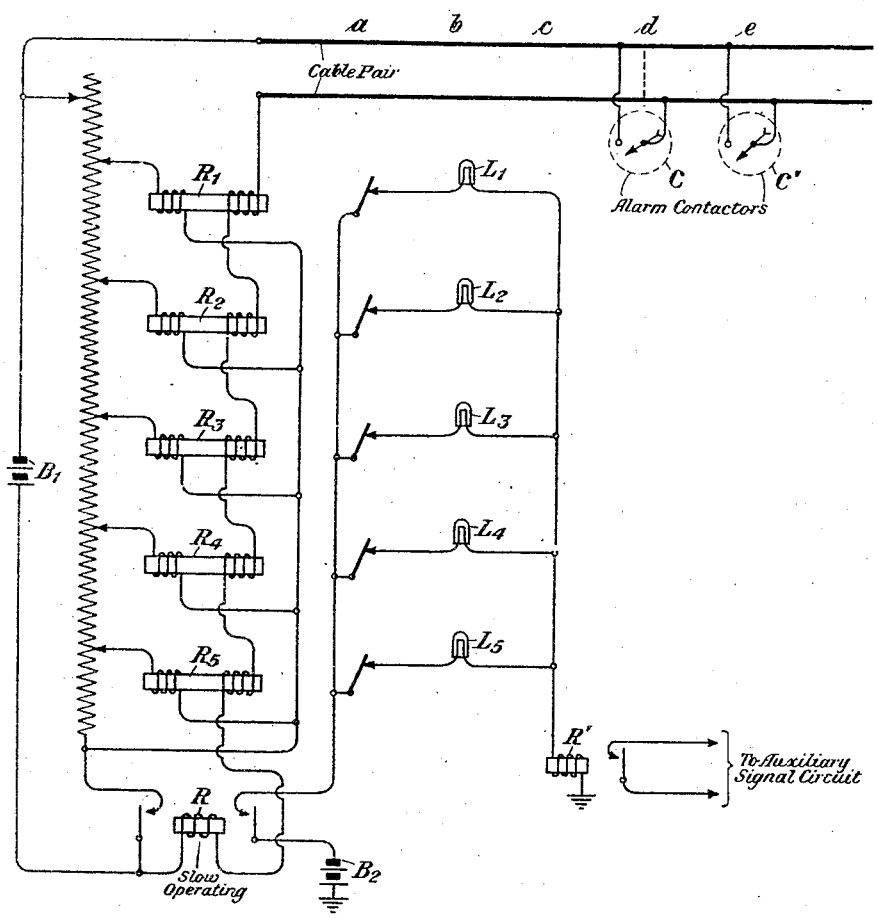
INVENTOR
S. P. Shackleton
ATTORNEY Patented Apr. 26, 1932

1,855,321

UNITED STATES PATENT OFFICE

SAMUEL P. SHACKLETON, OF WYOMING, NEW JERSEY, ASSIGNOR TO AMERICAN TELEPHONE AND TELEGRAPH COMPANY, A CORPORATION OF NEW YORK

GAS PRESSURE ALARM SYSTEM FOR TOLL CABLES

Application filed January 27, 1930. Serial No. 423,834.

This invention relates to indicating means, and more particularly to arrangements of apparatus and circuits for indicating at which one of a number of fixed points a long pair of conductors is short-circuited.

In connection with the testing of long cables, it is the practice to maintain the cable under gas pressure. If this pressure falls below the normal or a predetermined value, it is desirable that an indication be given; accordingly, it is good practice to install at intervals along the cable low pressure alarm contactors or equivalent devices, which operate to short-circuit a pair of a spare quad and produce a visual or audible signal at the repeater station, for instance, when the pressure falls.

The present invention is designed primarily to give a suitable indication of the location of the point on the cable at which the alarm pair is short-circuited. It will be obvious, however, that the applicant's arrangement is broadly applicable to the indicating of the location of a short-circuit at any one of a number of fixed points on an extended pair of conductors.

In general, the applicant's arrangement comprises a plurality of signaling devices corresponding in number and arrangement to the short-circuiting devices along the cable and means for causing the operation, in response to the operation of one of the short-circuiting devices, of the corresponding one of the signaling devices.

The invention will be clearly understood when the following detailed description of one desirable embodiment is read with reference to the accompanying drawing, which shows that embodiment in diagrammatic form.

The cable pair shown may be the alarm pair of a square quad, and $a$, $b$, $c$, $d$ and $e$ indicate points at which this pair may be short-circuited by devices such as low pressure alarm contactors. By way of illustration, two alarm contactors C and C' are diagrammatically represented at points $d$ and $e$, respectively. As is well understood in the art, when the pressure in the cable falls below a predetermined value, a contactor operates to close its contact and place a short-circuit on the pair of conductors.

Differential relays $R_1$, $R_2$, $R_3$, $R_4$ and $R_5$ correspond to the points $a$, $b$, $c$, $d$ and $e$, respectively, on the cable pair. Corresponding to these relays are lamps $L_1$, $L_2$, $L_3$, $L_4$ and $L_5$. In addition, an auxiliary relay R is provided; this relay should be slow operating. Each of the relays $R_1$, $R_2$, $R_3$, $R_4$ and $R_5$ has its right-hand winding in series with the cable pair, the winding of relay R and a battery $B_1$. Differentially arranged with respect to the right-hand winding of each of the relays $R_1$ to $R_5$ is a left-hand winding, which may be termed the local winding. The armatures of relays $R_1$ to $R_5$, in the released position of the relays, prepare the closing of circuits through the respective lamps $L_1$ to $L_5$ and a battery $B_2$. The connection of the local windings of the relays $R_1$ to $R_5$ to the resistance shown at the left of the drawing is to be noted.

If, now, contactor C at point $d$, for instance, operates to place a short-circuit on the pair at that point, as indicated by the dotted line, the right-hand or line windings of relays $R_1$ to $R_5$ carry current and the relay R is energized. The right-hand armature of relay R prepares a circuit from battery $B_2$ to the lamps $L_1$ to $L_5$, and the left-hand armature of this relay causes the energization of the local windings of relays $R_1$ to $R_5$. The resistance is so arranged that, upon the completion of these circuits, the differential relay corresponding to the point at which the short-circuit is placed on the cable pair will have equal currents in its line and local windings, whereas the other differential relays will have different currents in the two windings. Accordingly, it will be understood, the appropriate relay will release and its armature will complete the circuit through the corresponding one of the lamps $L_1$ to $L_5$, while the remaining lamp circuits will be held open by the operated condition of the respective relays.

In circuit with the battery $B_2$ and the lamps $L_1$ to $L_5$ is the winding of a relay R', designed to operate with any one of the lamps to close an auxiliary signal circuit.

While the invention is disclosed in one specific embodiment, which is deemed desirable, it is to be understood that it is capable of embodiment in other and different forms within the scope of the appended claims.

What is claimed is:

1. In association with an extended pair of conductors and a plurality of short-circuiting devices designed to operate thereon, said short-circuiting devices being located along said pair at intervals of considerable length, a plurality of differential relays corresponding in number to said short-circuiting devices, a slow-operating relay, and a plurality of signaling devices each controlled by one of said differential relays through a release contact thereof, each of said differential relays having a first winding in series with the conductors of said pair and the winding of said slow-operating relay and a second winding adapted to be connected in circuit with a source of voltage and resistances upon the operation of said slow-operating relay, the arrangement of resistances being such that upon the operation of any one of said short-circuiting devices a certain one of said differential relays will be released to operate the corresponding signaling device, while the other differential relays will operate to prevent the operation of the corresponding signaling devices.

2. In association with an extended pair of conductors and a plurality of short-circuiting devices designed to operate thereon, said short-circuiting devices being located along said pair at intervals of considerable length, apparatus grouped at a single station on the line of said pair, said apparatus comprising a plurality of differential relays corresponding in number to said short-circuiting devices, a slow-operating relay, a plurality of signaling devices each controlled by one of said differential relays through a release contact thereof, a source of voltage, and a resistance, each of said differential relays having a first winding in series with the conductors of said pair and the winding of said slow-operating relay and a second winding associated with a particular portion of said resistance and adapted to be connected in circuit therewith and with said source of voltage upon the operation of said slow-operating relay, the particular portion of said resistance associated with each of said second windings being so chosen with reference to the spacing of the short-circuiting devices that upon the operation of any one of said devices a certain one of said differential relays will have equal currents in its two windings while the other differential relays will each have unequal currents in its two windings.

In testimony whereof, I have signed my name to this specification this 25th day of January, 1930.

SAMUEL P. SHACKLETON.